(12) United States Patent
Mirmobini et al.

(10) Patent No.: US 7,881,342 B2
(45) Date of Patent: Feb. 1, 2011

(54) DYNAMICALLY AND ON-DEMAND SELECTED ANCILLARY DATA OVER COMPRESSED MULTIMEDIA PACKETS WITHOUT BANDWIDTH EXPANSION

(75) Inventors: Maryam Mirmobini, Rumson, NJ (US); Mohsen Sarraf, Rumson, NJ (US); Chris Vaios, 84 Garden Rd., Shrewsbury, NJ (US) 07702

(73) Assignee: Chris Vaios, Shrewsbury, NJ (US)

( * ) Notice: Subject to any disclaimer, the term of this patent is extended or adjusted under 35 U.S.C. 154(b) by 294 days.

(21) Appl. No.: 12/239,524

(22) Filed: Sep. 26, 2008

(65) Prior Publication Data

US 2009/0086761 A1     Apr. 2, 2009

Related U.S. Application Data

(60) Provisional application No. 60/995,464, filed on Sep. 27, 2007, provisional application No. 61/063,683, filed on Feb. 6, 2008.

(51) Int. Cl.
*H04L 29/04* (2006.01)
(52) U.S. Cl. .................................................... 370/476
(58) Field of Classification Search ................ 370/389, 370/395.5–395.65, 465–476
See application file for complete search history.

(56) References Cited

U.S. PATENT DOCUMENTS 7,505,485 B2 *   3/2009   Sullivan et al. ............. 370/474

OTHER PUBLICATIONS

Sotiropoulos et al, Transmission and Multiplexing of Uncompressed Video and Ancillary Signals over a New Multimedia Frame, IEEE, 7 pages, 2001.*

* cited by examiner

*Primary Examiner*—Frank Duong
(74) *Attorney, Agent, or Firm*—xCypher, LLC

(57) ABSTRACT

A system and method for providing ancillary data over compressed multimedia packets. Ancillary data may be added to encoded or compressed packets without increasing the bandwidth required to transmit the packets over a transmission medium. After transmission, the ancillary data can be recovered and the packets restored to their original form without any loss of data or damage to original content. The ancillary data can be presented to a user on-demand, or in response to an event. The content of the ancillary data can also be correlated to the type of event that initiated the delivery or to the content of the encoded or compressed packets.

18 Claims, 10 Drawing Sheets

DYNAMICALLY AND ON-DEMAND SELECTED ANCILLARY DATA OVER COMPRESSED MULTIMEDIA PACKETS WITHOUT BANDWIDTH EXPANSION

CROSS-REFERENCE TO RELATED APPLICATIONS

The present application claims priority under 35 U.S.C. §119(e) from the following patent applications which are incorporated herein by reference in their entireties: U.S. Provisional Patent Application Ser. No. 60/995,464, filed Sep. 27, 2007, entitled ANCILLARY DATA OVER COMPRESSED MULTIMEDIA PACKETS WITHOUT BANDWIDTH EXPANSION and U.S. Provisional Patent Application Ser. No. 61/063,683, filed Feb. 6, 2008, entitled DYNAMICALLY AND ON-DEMAND SELECTED ANCILLARY CHANNELS OVER MULTIMEDIA PACKETS.

BACKGROUND OF THE INVENTION

1. Field of the Invention

The invention generally relates to the field of communications systems, and more particularly, to a system and method for increasing the throughput of a communication system without increasing the required bandwidth.

2. Description of the Related Art

Most compression or encoding methods for digital information take the data bits of interest and append a header for control applications on a regular and known pattern basis to form frames of data. These frames are then transmitted over the medium of interest, be it a wireless channel, the internet, a satellite channel, cable, or some other medium. A receiver accepts these frames and uses the header information within each frame to decode the information bits within the frame. The original information data bits of interest are then extracted from the frame.

Typically, the headers have a known fixed sequence of bits usually referred to as a synch pattern. The receiver uses such synch patterns to acquire synchronization in the beginning and during reception or when synchronization is lost. The synch patterns are used as flags to enable the receiver to detect frame boundaries. The exact sequence of bits in the synch pattern depends on the compression or encoding technology. The number of bits and frequency of occurrence will also vary depending on the technology. FIG. 1 illustrates an example data frame with synch, header, and data information.

There are currently a number of techniques for adding additional information to encoded or compressed digital information; however, these techniques either increase the bandwidth required to transmit the information or alter it in a manner that is not reversible. Examples of such techniques include: watermarking, fingerprinting, and steganography. Thus, it would be advantageous to have a method that would allow additional information to be added to encoded or compressed digital information without the loss of any data of interest or an increase in the bandwidth required to transmit the information.

Most advertisement content is conventionally delivered in a concatenated format within a digital video stream or file. Usually, the stream or file is compressed. Advertising information in any form, such as MP3, MPEG2, MPEG4, AMR, etc. can be identified with data bits of interest, such as a tag to link a separate stream of information. A header can be appended for control applications on a regular and known pattern to form frames of data that act as triggers when requested by an application. Frames can then be transmitted over a transmission medium, be it a wireless channel, the internet, a satellite channel, cable, or some other medium.

The receiving application receives these frames and stores them locally on a device such as a computer, mobile device, or set-top-box. The application can use this information in various ways. For example, if the pause button on the remote control is pressed, a prerecorded advertisement segment or a promotion could be presented during the pause period. The advertisement can be interrupted as soon as the play button is pressed and the film continued. Similarly, another button can be selected to show the advertisement in a second screen (screen-on-screen feature).

In order for these advertisements to be delivered to a consumer, increased bandwidth and network resources are required. To account for this additional bandwidth, service providers need to provide additional capacity. Thus, it would be advantageous to have the proposed herein system and method that would allow such content to be delivered without requiring any additional bandwidth or network resources, thereby minimizing the capacity requirements of the network.

BRIEF SUMMARY OF THE INVENTION

The transmission of ancillary data over a transmission medium without bandwidth expansion is possible in accordance with a first aspect of the present invention. In many data transmission and compression systems, a header is appended to the data bits of interest in a regular and known pattern to form frames of data. Typically, the header has a known fixed sequence of bits usually referred to as a synch pattern. Many compressed multimedia formats include a synch pattern or other known fixed pattern of bits within frames of data. The present invention provides a system and method for altering a known fixed pattern in a data frame based on ancillary data, thus allowing the transmission of additional data of interest without increasing the overall number of data bits that are transmitted. The altered frame of data can then be transmitted over a transmission medium to a receiver.

In one embodiment, the data bits that are used to alter the known fixed pattern of bits are selected from a table containing a group of predefined bit sequences. The ancillary data bits are used as an index to select a bit sequence from the table. In another embodiment, only a portion of the known fixed pattern of bits is altered in this manner. The remainder of the known fixed pattern of bits is altered directly by a portion of the ancillary data bits. The known fixed pattern of bits may be altered by performing a mathematical operation, such as a bitwise exclusive-or, with the ancillary data bits or the sequence of bits selected from the table. Alternatively, the known fixed pattern of bits is replaced by the ancillary data bits or the sequence of bits selected from the table.

The present invention also provides a system and method at the receiving side for retrieving the ancillary data from the altered data frame and returning the altered data frame to its original form. If the known fixed pattern of bits was simply replaced, the data frame is searched for the bit sequences that are contained within the table. If the known fixed pattern of bits was altered rather than replaced, the inverse of the mathematical operation that altered the bits is performed using the altered data frame bits and each of the bit sequences from the table. The results of these mathematical operations are then searched for the original known fixed pattern of bits. The ancillary data can thereby be located within the altered data frame. Once located, the ancillary data is extracted and the data frame is returned to its original form by replacing the altered bits with the original known fixed pattern of bits. In some embodiments, additional knowledge of the data frame structure is used to facilitate the retrieval process. For example, if the interval between the known fixed patterns within a frame is known, this information can be used to aid in the retrieval process. After it is extracted, the ancillary data is delivered to the end-user.

In a further aspect of the present invention, a system and method for delivering ancillary data to an end-user in response to a user action or other event is described. The user action may be an explicit request for ancillary data. Alternatively, the user action may be an implicit request, such as the selection of the pause function of a media player. For example, advertising content could be transmitted to the user as ancillary data in response to such an implicit request. Additionally, the event need not be generated by the end-user, but may instead be generated by the system or some other entity. In some embodiments, the content of the ancillary data is correlated to the user action or event, thus allowing the user to receive different content based on the type of action or event that initiated the delivery.

In yet a further aspect of the present invention, a system and method for delivering ancillary data to an end-user is described wherein the ancillary data is correlated to the data in the unaltered portion of the data frame. Such a system has the benefit of allowing for context based advertising. For example, advertisements for a vehicle that is featured in a movie being viewed by a user could be distributed to the user via ancillary data inserted into the data frames of the media stream containing the movie.

The foregoing features of the invention, as well as the advantages offered thereby, are explained in greater detail with reference to the exemplary implementations illustrated in the accompanying drawings.

DETAILED DESCRIPTION OF THE INVENTION

Figure 1:
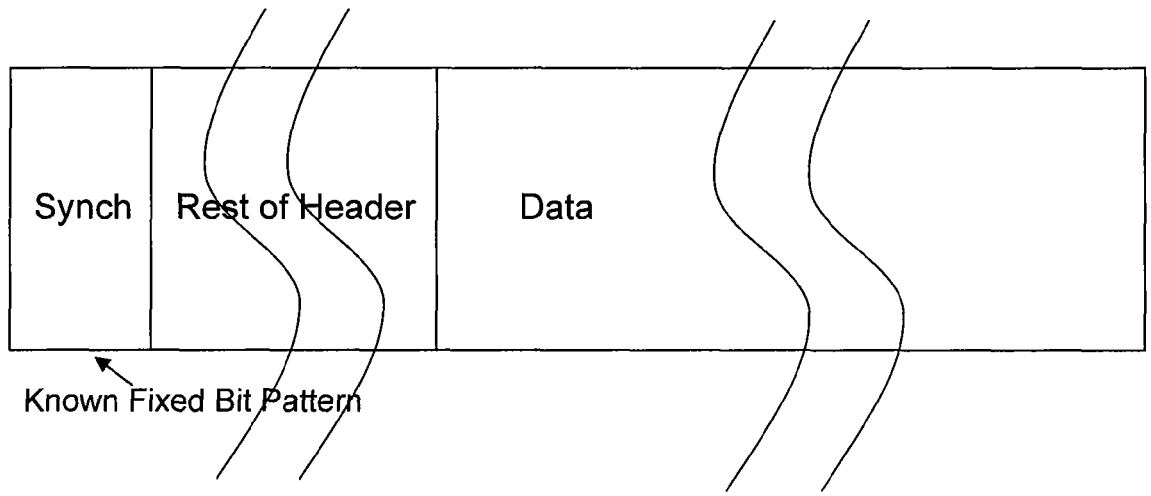
FIG. 1 is an illustration of a data frame with synch, header, and data information.

FIG. 1 illustrates an example data frame with synch, header, and data information. The synch section of this example data frame includes a known fixed pattern of bits. The present invention is generally directed to a system and method of taking advantage of this known fixed pattern of bits and the data frame structure to encode additional ("ancillary") data. Referring to FIGS. 1-4 and 6, the system includes an ancillary channel transmitter 100 that inserts ancillary data 160 into a data frame and an ancillary channel receiver 200 that retrieves this information and restores the data frame to its original form.

Ancillary Channel Transmitter 100

Figure 2:
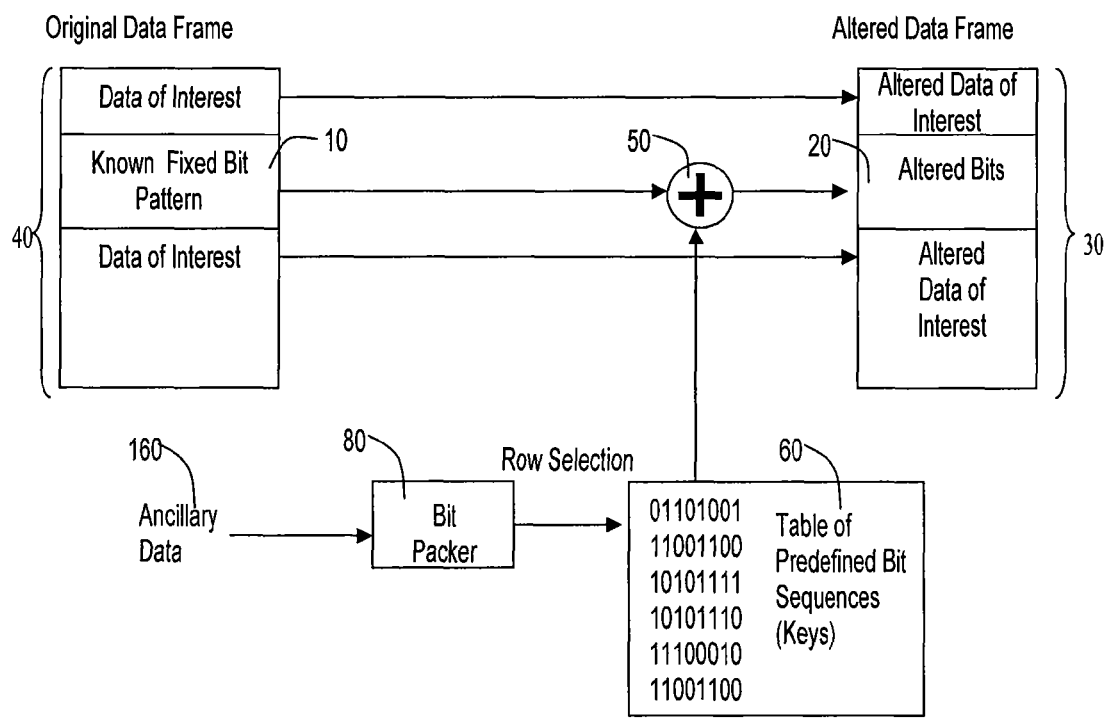
FIG. 2 is a block diagram of a system for inserting ancillary data into a data frame by altering a known fixed bit pattern within the data frame with a bit sequence selected from a table.

FIG. 2 illustrates a system adapted to insert ancillary data 160 into a data frame by altering a known fixed bit pattern 10 within the original data frame 40. The relative position of the known fixed bit pattern 10 shown in FIG. 2 is for illustrative purposes only. The known fixed bit pattern 10 can be located at any location within the original data frame 40 and need not be contiguous. The ancillary channel transmitter 100 can be implemented in hardware or in software as computer programs.

The group of bits used to alter the known fixed bit pattern 10 is called the key 65. The key 65 is selected from a table 60 containing a group of predefined bit sequences. In some embodiments, the table 60 is formed of the rows of a Haddamard matrix.

The bit packer 80 packs the ancillary data into a group of N bits. The group of ancillary data bits is used to select a key 65 from the table 60. The table 60 should contain at least $2^N$ unique predefined bit sequences. Additionally, the known fixed bit pattern 10 has a length greater than or equal to N. In an extreme example where the length of the known fixed bit pattern 10 is equal to N, every possible bit pattern of length N would be represented in the table. Thus, the selected key 65 may have exactly the same bit pattern as the output of the bit packer 80.

The known fixed bit pattern 10 is altered by performing a mathematical operation 50 using the known fixed bit pattern 10 and the key 65. In some embodiments, the mathematical 50 operation is a bitwise exclusive-or (XOR) operation. The mathematical operation 50 is not limited to a bitwise exclusive-or, but can be any mathematical operation known in the art. The result of the mathematical operation 50 contains the same number of bits as the known fixed bit pattern 10. This result is inserted into the altered data frame 30 in the same relative position as the known fixed bit pattern 10 held in the original data frame 40. The remaining data bits in the original data frame 40 are copied to the altered data frame 30, maintaining their relative positions. In some embodiments, the data bits are not copied to a new altered data frame 30, and instead the known fixed bit pattern 10 in the original data frame 40 is altered directly.

Figure 3:
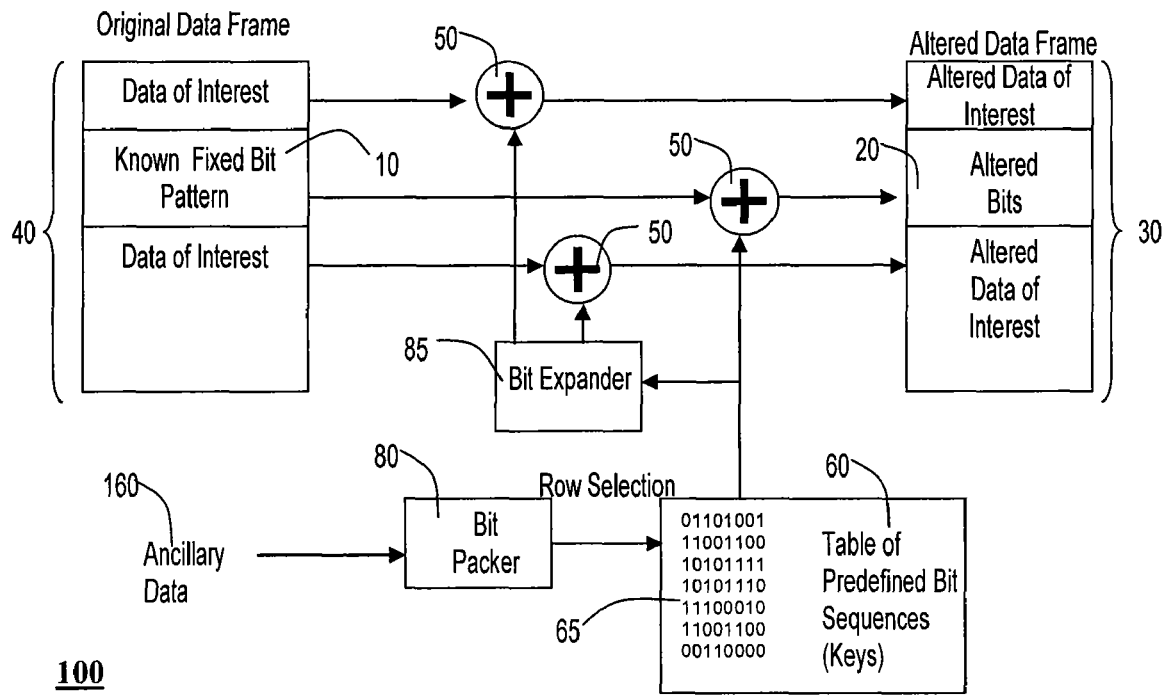
FIG. 3 is a block diagram of a system for inserting ancillary data into a data frame by altering the entire data frame with a bit sequence selected from a table.

FIG. 3 illustrates a system adapted to insert ancillary data 160 into a data frame by altering all of the bits within the original data frame 40. This system differs from the system illustrated in FIG. 2 in that all of the bits within the frame are altered by the key 65 selected from the table 60.

As in the system illustrated in FIG. 2, the bit packer 80 packs the ancillary data into a group of N bits. The group of ancillary data bits is used to select a key 65 from the table 60.

The bit expander 85 expands the key 65 by concatenating multiple copies of the key 65 to form a sequence of bits of the same length as the data frame, excluding the known fixed bit pattern 10. If the length of the data frame, excluding the known fixed bit pattern 10, is not an integer multiple of the length of the key 65, then the bit expander 85 will truncate the expanded sequence so that the lengths match.

The known fixed bit pattern 10 is altered by performing a mathematical operation 50 using the known fixed bit pattern 10 and the key 65. In some embodiments, the mathematical 50 operation is a bitwise exclusive-or (XOR) operation. The result of this operation is inserted into the altered data frame 30 in the same relative position as the known fixed bit pattern 10 held in the original data frame 40.

The remaining data bits in the original data frame 40 are altered by performing a mathematical operation 50 using these bits and the output of the bit expander 85. The output of this mathematical operation 50 is copied to the altered data frame 30.

Figure 4:
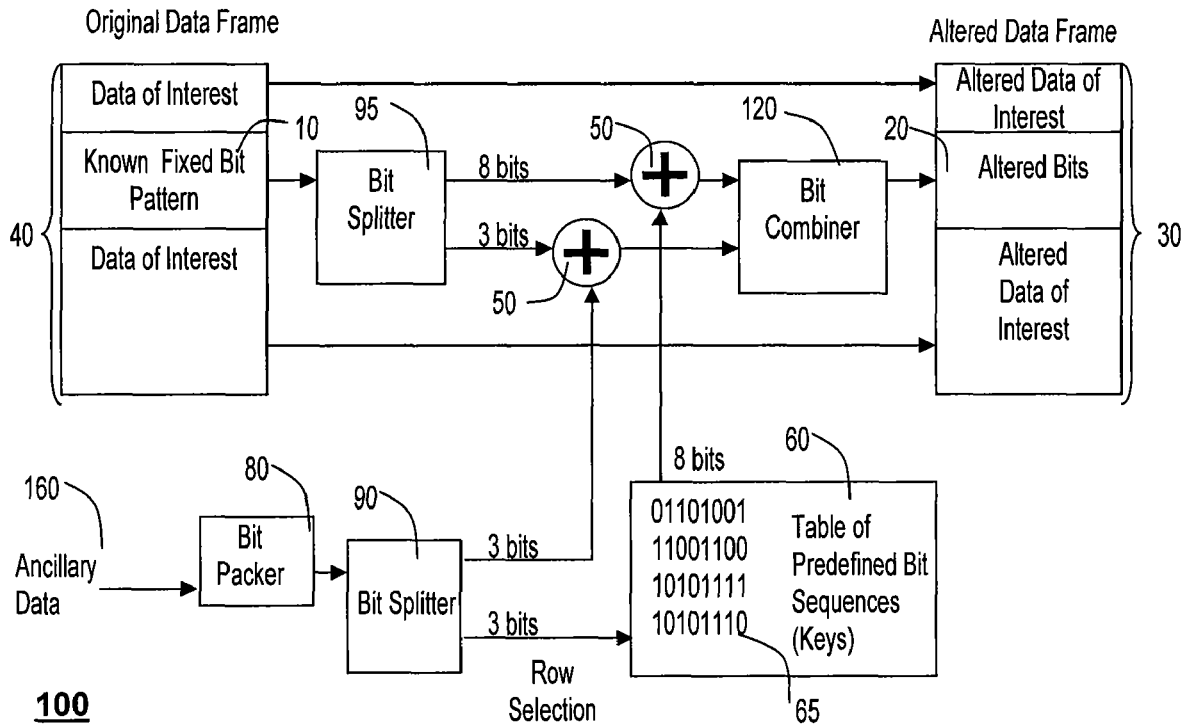
FIG. 4 is a block diagram of a system for inserting ancillary data into a data frame by altering a known fixed bit pattern within a data frame.

FIG. 4 illustrates a system adapted to insert ancillary data 160 into a data frame by altering a known fixed bit pattern 10 within the original data frame 40. This system differs from the system illustrated in FIG. 2 in that only a portion of the known fixed bit pattern 10 is altered by a key 65 selected from a table 60; the remainder of the known fixed bit pattern 10 is altered directly by a portion of the ancillary data 160. The system depicted in FIG. 4 has an eleven bit known fixed bit pattern 10. This length is depicted for illustrative purposes only. The system will work equally well with a known fixed bit pattern 10 of a different length.

The bit packer 80 packs the ancillary data into a group of N bits. The known fixed bit pattern 10 has a length greater than or equal to N. A first bit splitter 90 splits the packed bits into groups of length X and Y. A second bit splitter 95 splits the known fixed bit pattern 10 into groups of length X and Z.

The output of the first bit splitter 90 of length X is used to directly alter the output of the second bit splitter 95 of length X by performing a mathematical operation 50. In some embodiments, the mathematical operation 50 is a bitwise exclusive-or (XOR) operation.

The output of the first bit splitter 90 of length Y is used to select a key 65 from the table 60. The table 60 should contain at least $2^Y$ unique predefined bit sequences. The output of the second bit splitter 95 of length Z is altered by performing a mathematical operation 50 using this output and the key 65. The result of the mathematical operation 50 should contain Z bits.

The bit combiner 120 combines the results of the two mathematical operations 50 by concatenating the bits that are output from the two mathematical operations. The output of the bit combiner 120 is inserted into the altered data frame 30 in the same relative position as the known fixed bit pattern 10 held in the original data frame 40. The remaining data bits in the original data frame 40 are copied to the altered data frame 30, maintaining their relative positions. In some embodiments, the data bits are not copied to a new altered data frame 30; the known fixed bit pattern 10 in the original data frame 40 is instead altered directly.

Figure 5:
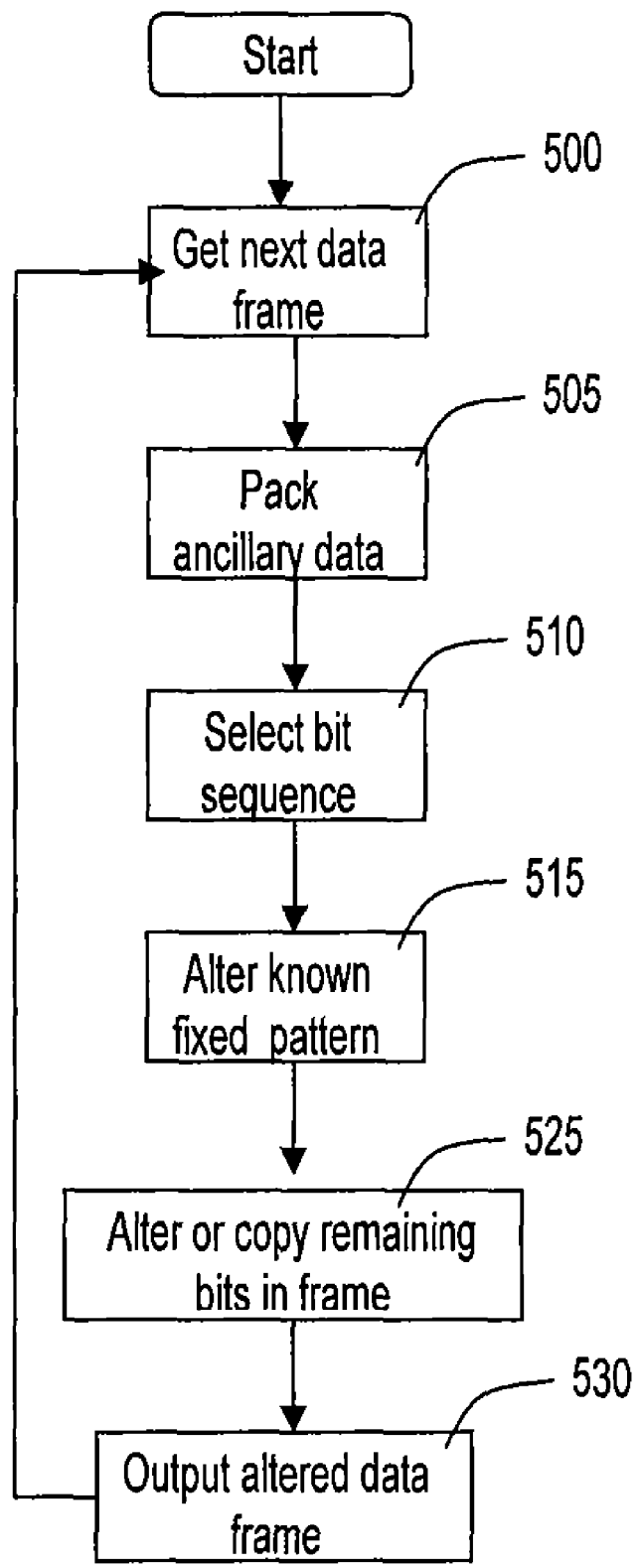
FIG. 5 is a logic flow diagram representative of a method of inserting ancillary data into a data frame by altering a known fixed bit pattern within the data frame.

FIG. 5 illustrates a method of inserting ancillary data 160 into a data frame. At step 500, the next data frame is retrieved from the encoded data. At step 505 the ancillary data is packed into a group of N bits. In some embodiments, at step 510, the N bits are used to select a key 65 from a table 60 containing a group of predefined bit sequences. In other embodiments, only some of the N bits are used to select a bit sequence from a table 60 containing a group of predefined bit sequences. The remainder of the N bits are used to directly alter an equal number of bits in the known fixed bit pattern 10. In some embodiments, the table 60 is formed of the rows of a Haddamard matrix.

At step 515, the known fixed bit pattern 10 is altered by performing a mathematical operation 50 using the known fixed bit pattern 10 and either the key 65 or a group of bits formed by concatenating the key 65 selected by a portion of the N bits with the remainder of the N bits. In some embodiments, the mathematical operation 50 is a bitwise exclusive-or (XOR) operation. The result of the mathematical operation 50 contains the same number of bits as the known fixed bit pattern 10. This result is inserted into the altered data frame 30 in the same relative position as the known fixed bit pattern 10 held in the original data frame 40.

At step 525, the remaining data bits in the original data frame 40 are either copied to the altered data frame 30 or altered and then copied to the altered data frame 30. If the remaining data bits are to be altered, they are altered by performing a mathematical operation 50 using the remaining data bits and a bit pattern formed by concatenating multiple copies of the key 65. If the number of remaining data bits is not an integer multiple of the number of bits in the key 65, the bit pattern formed of concatenated keys 65 is truncated to have the same number of bits as the remaining data bits.

At step 530, the altered data frame 30 is output.

Ancillary Channel Receiver 200

Figure 6:
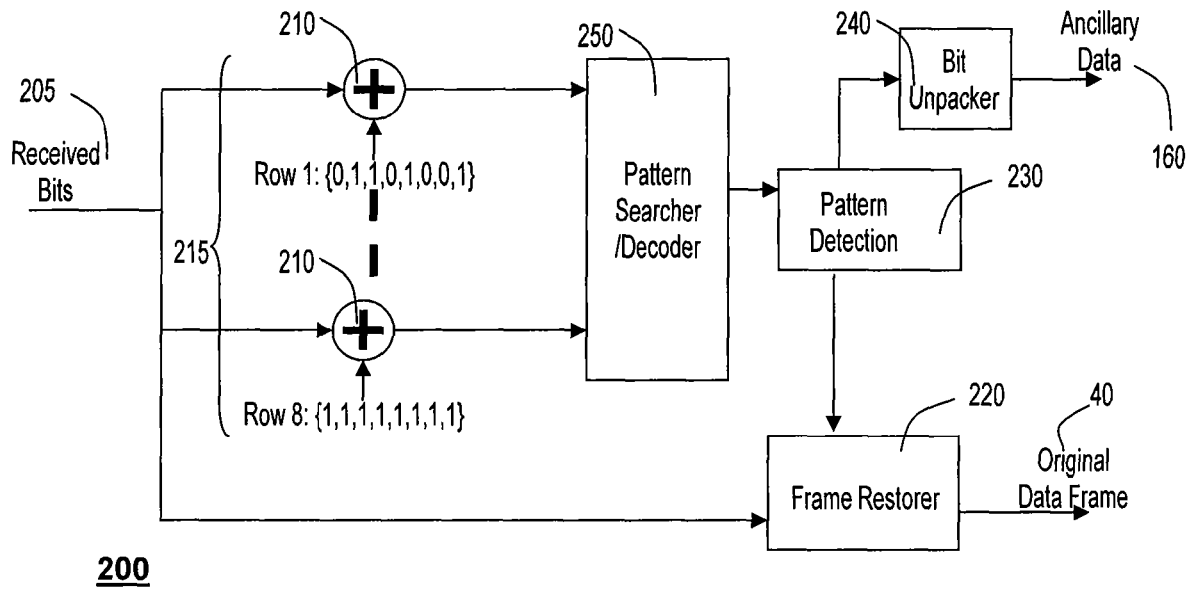
FIG. 6 is a block diagram of a system for retrieving ancillary data from an altered frame and restoring the frame to its original state.

FIG. 6 illustrates a system adapted to retrieve ancillary data 160 from an altered data frame 30 and to restore the original data frame 40. The inputs to the ancillary channel receiver 200 are the received bits 205. Typically, the received bits 205 were previously generated by an ancillary channel transmitter 100 and transmitted, via a transmission medium 150, to the ancillary channel receiver 200. The outputs of the ancillary channel receiver 200 are the ancillary data 160 and the original data frame 40. The ancillary channel receiver 200 can be implemented in hardware or in software as computer programs.

The received bits 205 are presented at the input of the ancillary channel receiver 200. The received bits 205 go through a bank of inverse mathematical operators 215, with each leg of the bank 215 operating on the received bits 205 and one of the predefined bit sequences from the table 60. The table 60 contains the same bit sequences in both the ancillary channel transmitter 100, as illustrated in FIG. 104, and the ancillary channel receiver 200, as illustrated in FIG. 5. Each operator 210 in the bank of inverse mathematical operators 215 is chosen so that the known fixed bit pattern 10 is the result of an operation using the altered bits 20 and the key 65 that was originally used to alter the known fixed bit pattern 10. In some embodiments, each inverse mathematical operator 210 is a bitwise exclusive-or (XOR). One of the legs in the bank of inverse mathematical operators 215 should output the known fixed bit pattern 10 after a maximum of one frame delay.

The pattern searcher/decoder 250 detects a match and indicates which predefined bit sequences from the table 60 operated on the bits when a match is detected.

In some embodiments, the pattern detection filter 230 uses additional information to verify that the ancillary data was properly decoded. For example, if the frame structure is known, the pattern detection filter 230 can verify that the known fixed bit pattern 10 comes out of the bank of operators at known frame length intervals. Any positive results that do not follow this pattern are disregarded.

The predefined bit sequence from the table 60 with which the known fixed bit pattern 10 is detected will have the same bit pattern as the key 65 that the known fixed bit pattern 10 was originally altered with. It can then be determined what group of bits was used to select the key 65. This group of bits is output from the pattern detection filter 230.

The group of bits that are output by the pattern searcher/decoder 250 are unpacked into individual bits by the bit unpacker 250. The output of the bit unpacker 240 is the ancillary data 160.

The frame restorer 220 replaces the altered portion of the original data frame 40 with the known fixed bit pattern 10. If all of the frame bits have been altered by the ancillary channel transmitter 100, they are restored to their original form by performing an inverse mathematical operation 210 using the remaining frame bits and the most recently detected key 65. The frame restorer 220 may need to have some latency associated with it because the known fixed bit pattern 10 is not always located at the beginning of the frame. In this case, the bits at the beginning of the frame must be stored until the next key 65 is detected.

The pattern searcher/decoder 250 and the pattern detection filter 230 provide timing information to enable the frame restorer 220 to replace or alter the correct bits. The original data frame 40 is thereby output by the frame restorer 220.

Figure 7:
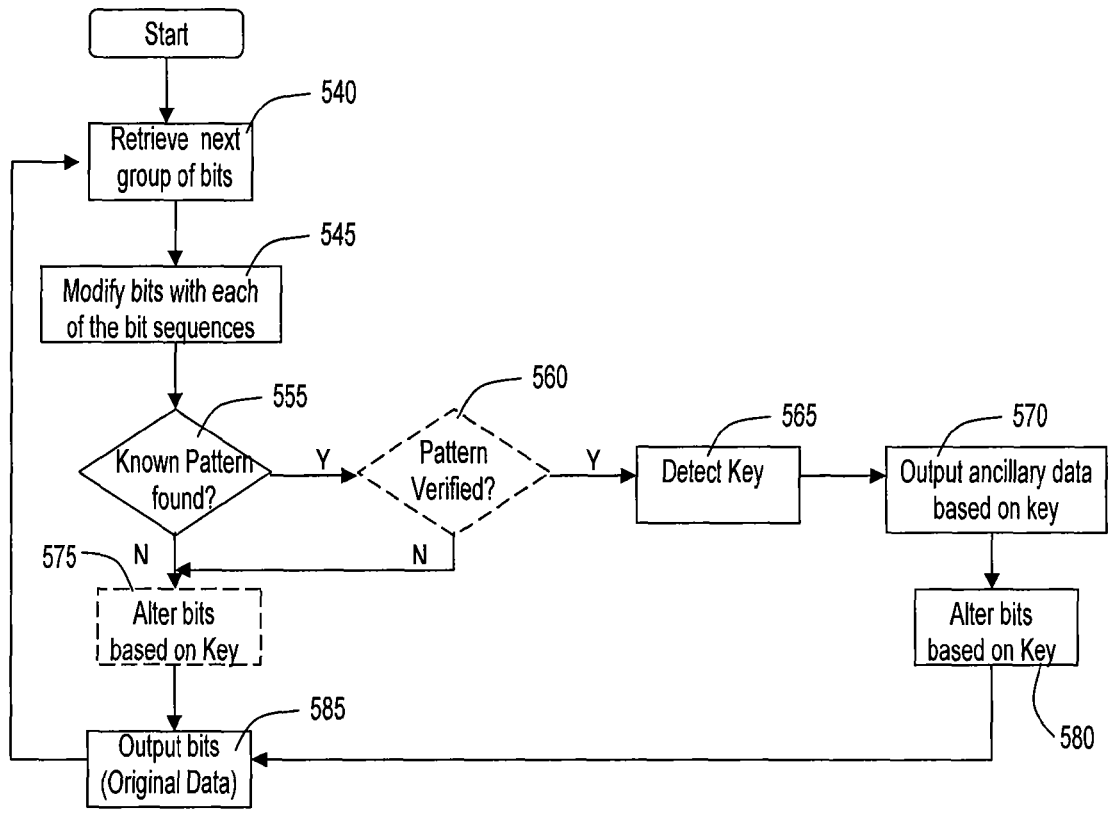
FIG. 7 is a logic flow diagram representative of a method of retrieving ancillary data from an altered data frame and restoring the data frame to its original state.

FIG. 7 illustrates a method of retrieving ancillary data 160 from an altered data frame 30 and restoring the original data frame 40.

At step 540, the next group of received bits 205 are retrieved from the receiver.

At step 545, inverse mathematical operations 210 are performed on the group of received bits 205 with each one of the predefined bit sequences from the table 60. The inverse mathematical operations 210 are chosen so that the known fixed bit pattern 10 is the result of an operation using the altered bits 20 and the key 65 that was originally used to alter the known fixed bit pattern 10. In some embodiments, each inverse mathematical operation 210 is a bitwise exclusive-or (XOR).

At step 555, the results of the inverse mathematical operations 210 are searched for the known fixed bit pattern 10. If found, control proceeds to step 560, otherwise control proceeds to step 575.

In some embodiments, the pattern is verified at step 560. Additional information about the data frame structure is used to verify that the known fixed bit pattern 10 was properly detected. For example, if the frame structure is known, the interval between detections of the known fixed bit pattern 10 can be verified. Any detections of the known fixed bit pattern 10 that do not match the expected interval are disregarded.

At step 565, the key 65 that originally altered the frame is detected, based upon which of the predefined bit sequences from the table 60 produced the known fixed bit pattern 10 in step 555. The ancillary data 160 that was used to select the key 65 is thereby known.

At step 570, the ancillary data 160 is output.

At step 580 the portion of the group of received bits 205 containing the key 65 is altered by replacing the portion with the known fixed bit pattern 10.

In some embodiments, all bits in the frame are altered by performing an inverse mathematical operation 210 on the group of received bits 205 and the last key 65 that was detected. If all of the bits are to be altered, the bits at the beginning of the frame may need to be stored until the proper key 65 is detected because the known fixed bit pattern 10 is not always located at the beginning of the frame.

At step 585, the resulting bits are output. The resulting bits are the same as those in the original data frame 40.

Ancillary Channels 180

Figure 8:
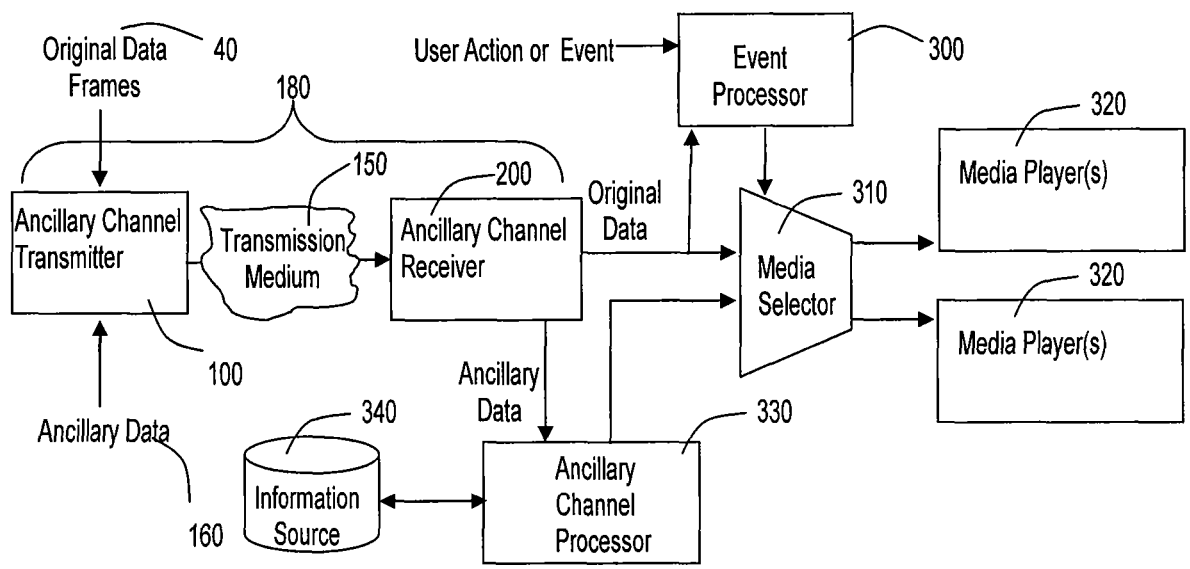
FIG. 8 is a block diagram of a system for selectively distributing ancillary data in response to an event.

In a further aspect of the present invention, the ancillary channel transmitter 100, as illustrated in FIGS. 1-4, and the ancillary channel receiver 200, as illustrated in FIG. 5, can be coupled together to form a system for communicating ancillary data 160. This system creates an ancillary channel 180 between the inputs of the ancillary channel transmitter 100 and the outputs of the ancillary channel receiver 200. FIG. 8 illustrates a system adapted to communicate ancillary data 160 across a transmission medium 150. The ancillary channel transmitter 100 adds the ancillary data 160 to compressed or encoded multimedia packets that are organized into original data frames 40. The output of the ancillary channel transmitter 100 is transmitted, via a transmission medium 150, to the ancillary channel receiver 200. The ancillary channel receiver 200 extracts the ancillary data 160 and restores the frames to their original form.

Billions if not trillions of packet transactions traverse wired and wireless networks to reach users every day. Using ancillary channels 180, each packet may be used to transfer ancillary data 160. The ancillary data 160 may, but need not be, transaction oriented information.

The ancillary data 160 "overlaid" or "glued" on every packet can be accessed by device applications and stored locally or remotely, enhancing the end-user experience with new applications while saving network and storage resources. The ancillary data 160 need not be associated with the original content or intended transaction. For example, the ancillary data 160 can be, but is not limited to, control information for devices, software downloads for device upgrades, information to be stored in end-devices locally for later use, or information to be delivered by a device application in response to an event.

Unlike present methods, the proposed system does not require any additional network resources to share, store, transfer or utilize information/content to perform various transactions. Additionally, there is no overhead required to set up or tear down an ancillary channel 180. Through the use of ancillary channels 180, the cost of managing services and applications is lowered for service providers and users alike.

Event Driven Delivery of Content Across Ancillary Channels

In yet a further aspect of the present invention, a system for delivering ancillary data 160 in response to an event is described. FIG. 8 illustrates such a system. The system includes an ancillary channel transmitter 100, an ancillary channel receiver 200, an event processor 300, an ancillary channel processor 330, and a media selector 310. In some embodiments, the ancillary channel processor 330 is communicatively coupled to an information source 340.

In this system, the ancillary data 160 that is output from the ancillary channel receiver 200 is delivered to the ancillary channel processor 330. The ancillary channel processor 330 may be a memory unit in some simple applications. In such applications, the ancillary data 160 output from the ancillary channel receiver 200 is directed to the media selector 310.

In some embodiments, the ancillary channel processor 330 is a processor that communicates with an information source 340, such as the internet. This communication may occur across another ancillary channel 180 or through some other means. The ancillary channel processor 330 communicates with the information source 340 and provides data to the media selector 310 based upon the content of the ancillary data 160 received. For example, if a URL link is provided via the ancillary channel 180, the ancillary channel processor 330 may connect to the internet, download the content provided at the URL address, and direct this content to the media selector 310.

The data from the ancillary channel processor 330 is not directed to a media player 320 or other destination until an event occurs. The event processor 300 has as inputs the output of the ancillary channel receiver 200, user actions, and other system events. In response to an event, the event processor 300 will direct the media selector 310 to deliver ancillary data 160 content. The ancillary channel 180 may carry multiple virtual channels and the event processor 300 can direct the media selector 310 as to which virtual channel is to be delivered.

The event can be generated by a timer, a location sensitive device, a system event, a user action, or through some other means. For example, the ancillary data 160 can be delivered in response to the user's selection of a button, such as the pause button on a media player 320. Alternately, the original content may be switched to ancillary content when a user moves into a particular geographic location of interest or at a specific time. The event can also be generated by the content of the original data frames 40. For example, a particular frame of a movie can generate an event that the event processor 300 responds to by directing the media selector 310 to deliver content that relates to the particular frame or scene in the movie.

Virtual Marketing Network

Figure 9:
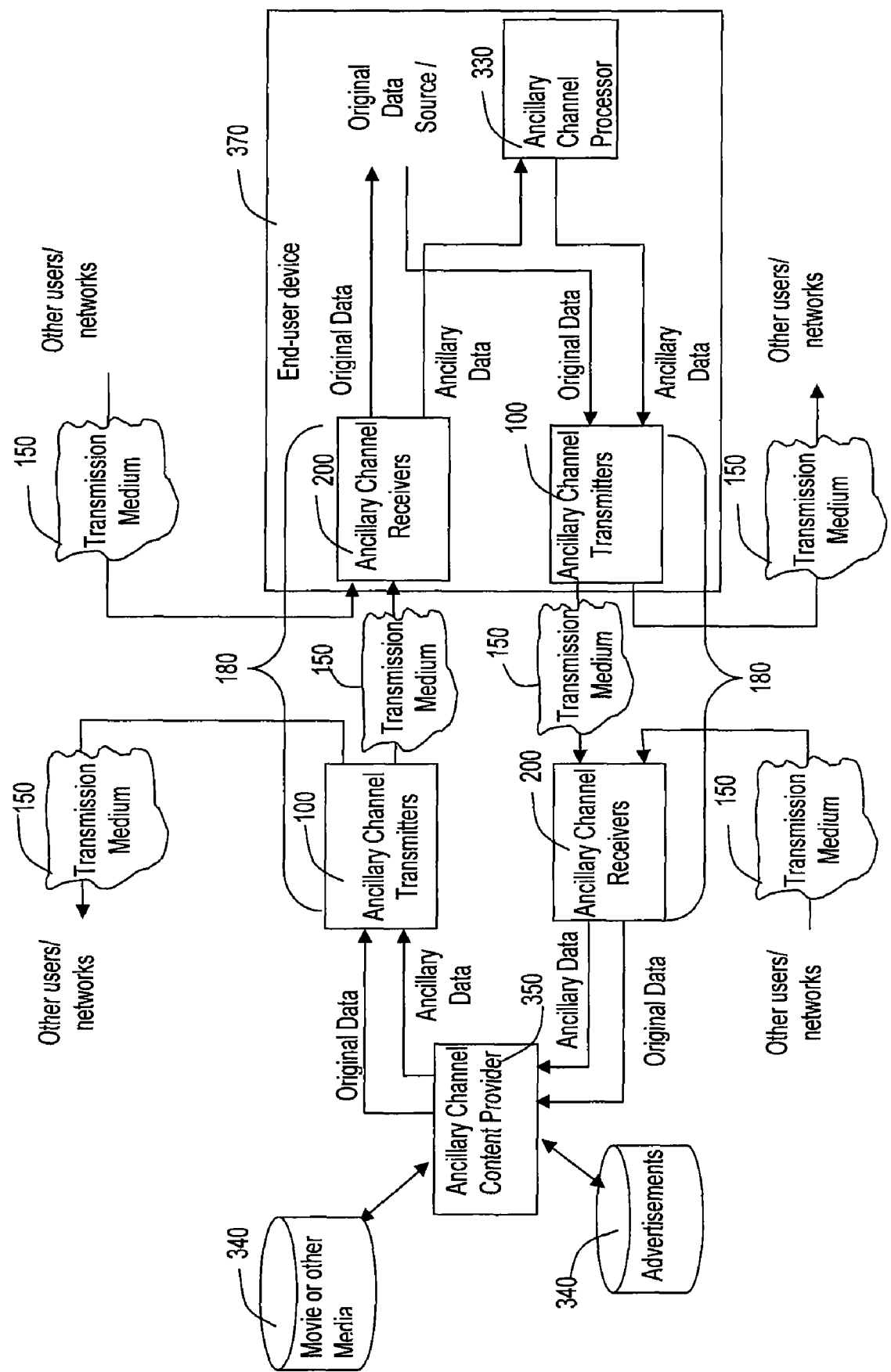
FIG. 9 is a block diagram of a system for selectively transmitting advertisements, coupons, and other information using ancillary data channels.

FIG. 9 illustrates a system adapted to provide a virtual marketing network through the exchange of packets across multiple networks and devices. The network may be the internet, a private network, a remote device, a server, a database, or any other system that enables devices or users to communicate with one another through a transmission medium 150. Specific product or service information can be distributed by an ancillary channel content provider 350, via an ancillary channel 180, to users. The ancillary channel content provider 350 may have connections to multiple information sources 340. The information may be targeted based upon the specific end-user profile, the type of transaction that the user is engaged in, the original content that the user is receiving, or by some other method. For example, content can be transmitted to a user, via an ancillary channel 180, based upon which movie the user is viewing. Furthermore, a virtual flyer in the form of an image or video clip can be embedded in the ancillary channel 180 and delivered to an end-user device 370 (PC, TV or mobile phone) while the user is performing an online transaction or the user is uploading/downloading content to or from the network. In some embodiments, the ancillary channel processor 330 includes a behavioral tracking system that operates transparently over an ancillary channel 180, continuously monitoring the online activities of the end-user.

In some embodiments, the virtual marketing network is part of a social network where many users who are part of a community can share their virtual ancillary channel to transfer information or credits, thus creating a continuous virtual ancillary marketing network. For example, a social networking site can use the virtual marketing network to allow users to share credits with each other, e.g., receive credits for watching an advertisement of a new product recently purchased by a friend in the social network. The virtual marketing network can also be used to connect to or retrieve information from remote devices and to share credits of use of information with third parties, like a virtual fulfillment system.

This transparent method of sharing information benefits network providers and operators as most of the information can be transferred to end-user devices 370 through a method similar to that used for caching links through cookies on browsers, but without impacting network capacity or storage. Locations can also be created to store such information in local devices. The information can be delivered to the user based on the identity of a specific end-user, as the result of a network event, as a result of some behavioral tacking metric, or in response to some other event.

Gaming

Figure 10:
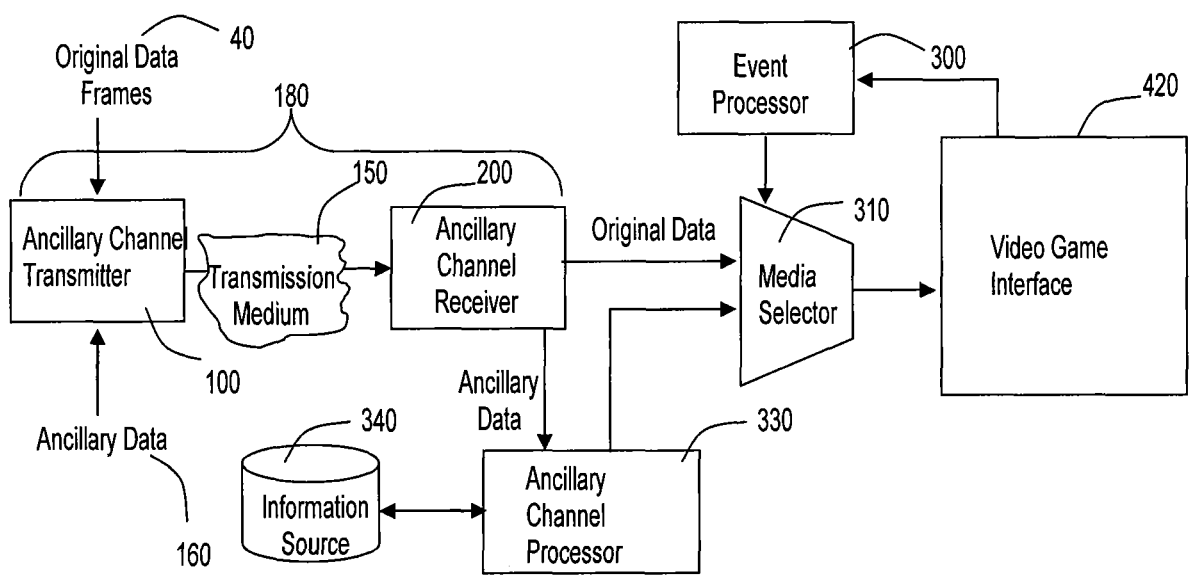
FIG. 10 is a block diagram of a system for selectively transmitting advertisements to a video game interface using ancillary data channels.

FIG. 10 illustrates a system adapted to provide advertisements or promotional coupons to connected online gaming users. The advertisements are delivered as ancillary data 160 during an on-line video game without impacting the performance of the game itself. For example, a user may engage in a live on-line game such as poker. A user who wishes to accept advertisements during such live games can participate for free or receive a discount. All such advertisements are delivered to and played on an extended customized video game interface 420. Advertisements may be displayed continuously, as part of the pause or stop functions of the game, during the game or during the final results of the game. The delivery of advertisements is controlled using the system adapted to event driven delivery of content across an ancillary channels 180. This system allows for advertisements to be dynamically changed and offers a better end-user experience without the need to change the original game or to create a secondary channel or increase the bandwidth.

In-stream Content Management

Figure 11:
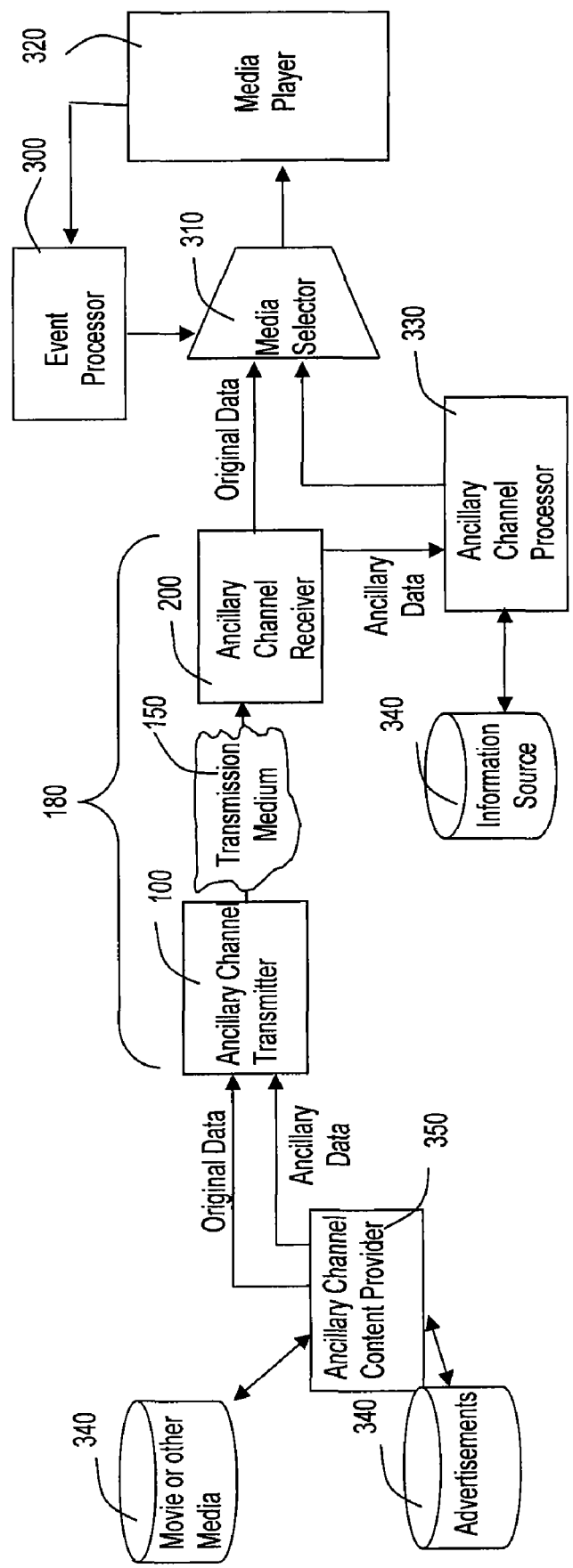
FIG. 11 is a block diagram of a system for transmitting in-stream advertisements to a media player using ancillary data channels.

FIG. 11 illustrates a system adapted to provide in-stream synchronized content, such as advertisements, to a user end-device through the use of ancillary channels 180. In accordance with a further aspect of the present invention, in-stream advertisements can be delivered automatically based on the content of the original media stream or user actions. The ancillary channel content provider 350 is communicatively coupled to information sources 340, containing advertisements and the original encoded media, e.g., movie. The ancillary channel content provider 350 provides both the advertisements, in the form of ancillary data 160, and the encoded media, as the original data frames 40, to the ancillary channel transmitter 100. The ancillary channel content provider 350 also embeds information into the ancillary data 160 to be used by the event processor 300 to determine when to display advertisements synchronized with the original data.

The present invention provides a unique capability that engages users and gives them control of which advertisements they view. For example, a movie clip of a new car can trigger the brand name of the car or a logo to be displayed on the corner of the display for the duration of the scene. If the user chooses to stop or pause the scene or select the logo, a special commercial giving more information of the car can be viewed. Not all of the advertisement information need to be local at that time, rather a link to a site could be provided as a tag inserted into the ancillary data.

Virtual Operator

Figure 12:
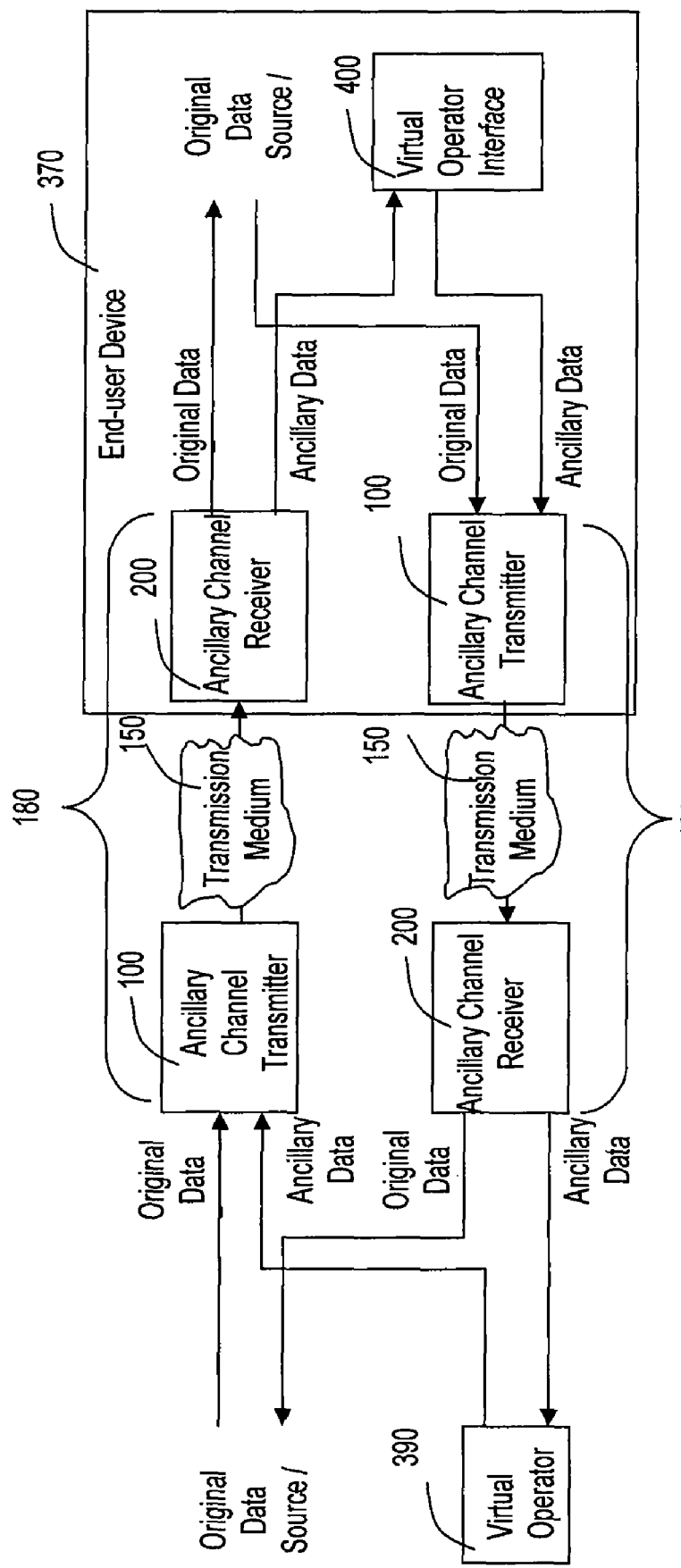
FIG. 12 is a block diagram of a system for providing a virtual operator service using ancillary data channels.

FIG. 12 illustrates a system adapted to provide a virtual operator 390 service to an end-user device 370. The virtual operator 390 communicates with the user through ancillary channels 180. A user can access the virtual operator 390 service by pressing a "softkey" programmed on the device or through some other virtual operator interface 400 without interrupting the original call. The virtual operator 390 service can be implemented through the event driven delivery of content across ancillary channels 180 without the need for telecom carrier intervention. Information is passed between the virtual operator 390 and the virtual operator interface 400 on ancillary channels 180 without expanding the bandwidth or bit rate of the original content. This method can also be used to download transparently to end-devices any voice or text messages saved in the network, therefore freeing significant amount of storage on the network site. Other services, such as location based services, could be provided in a similar manner.

Content Protection and Monitoring

Figure 13:
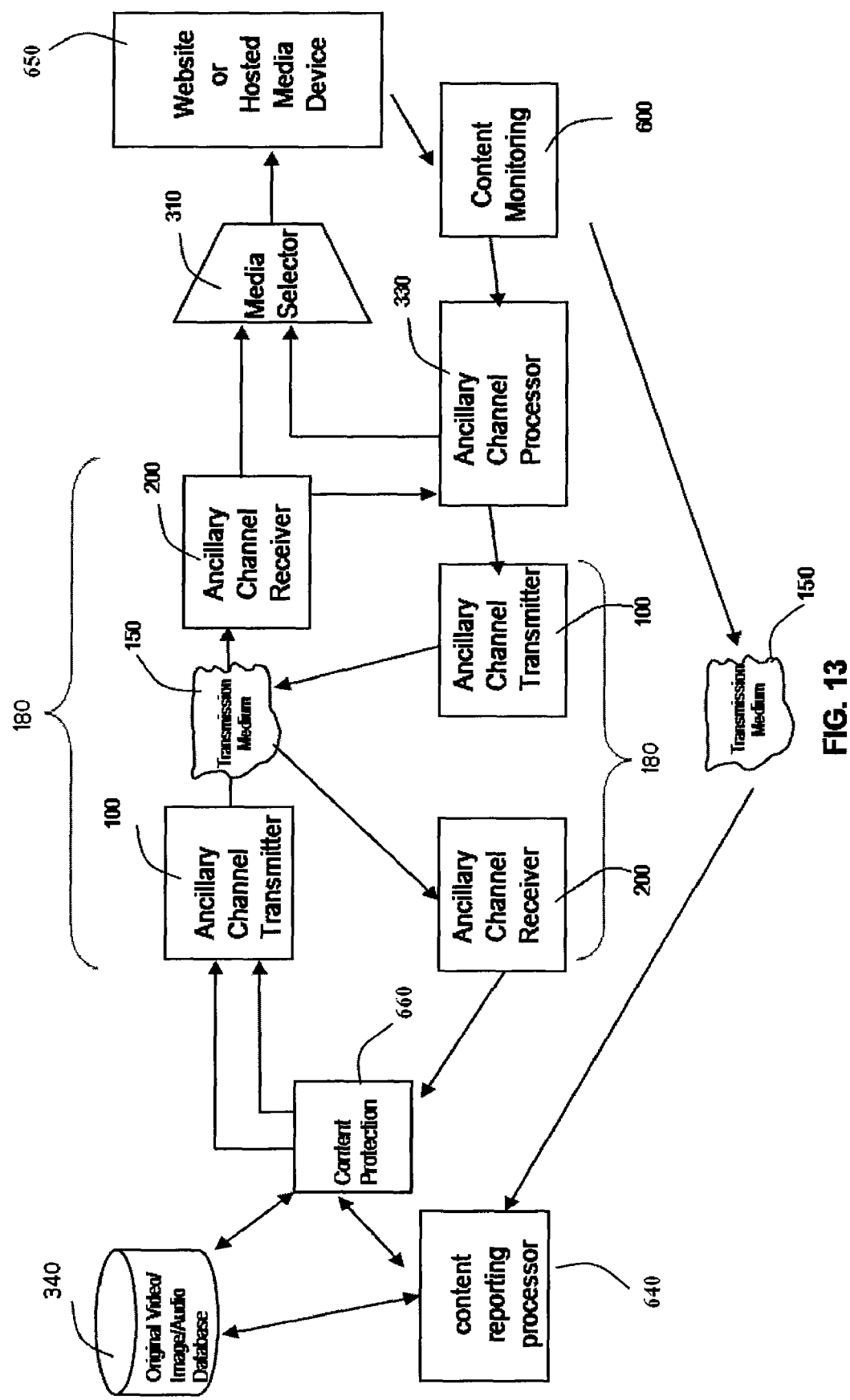
FIG. 13 is a block diagram of a system for providing content protection and monitoring of content usage.

FIG. 13 illustrates a system adapted to provide content protection and monitoring of content usage. The content is protected with a security key that is generated by the content protection module 660. The security key is embedded into a frame or series of frames as ancillary data 160. In addition to the security key, the frames can be tagged with other information such as the identity of the content owner, identifying characteristics of the content, or the identity of the source of the content. In the case of concatenated content, or content that includes advertising, different parts of the content may have different owners and be sourced from different locations, each part having its own identifying information.

The system includes a content monitoring module 600, which communicates with a website or hosted media device 650 and communicates with the content reporting processor 640. The content monitoring module 600 pro vides information to the content reporting processor 640 about the received content and the recipient associated with the website or hosted media device. For example, the content monitoring module 600 may report the recipient's IP address. The content reporting processor 640 may include a content detection system that compares the original content or information related to the original content with the information provided by the content monitoring module 600. Reporting can be timed to take place at a random time. Alternatively, reporting may be triggered as a result of an event such as the detection of an illegal copy of content. The reporting can be done over an ancillary channel 180 or through some other conventional means using a transmission medium 150.

Properly tagged content can also be monitored by a remote system (e.g., a crawler or agent) that has knowledge of the tagged information. Internet websites can thereby be automatically searched for tags indicative of misused or illegal content.

Although the invention has been described and illustrated in detail, it is to be understood that the same is by way of illustration and example and is not to be taken by way of limitation. The spirit and scope of the present invention are to be limited only by the terms of the appended claims.

The invention claimed is:

1. A method for encoding ancillary data, comprising the following steps:
   providing a plurality of bits organized into at least one frame, the at least one frame containing a known fixed bit pattern and a group of bits that vary in value;
   selecting a key bit pattern from a table based upon a group of ancillary data bits, the table containing a plurality of bit patterns;
   altering the at least one frame by replacing the known fixed bit pattern with a result of a first mathematical operation performed using the known fixed bit pattern and the key bit pattern; and
   transmitting the altered at least one frame across a transmission medium.

2. A method for decoding ancillary data, comprising the following steps:
   providing a table containing a plurality of bit patterns;
   receiving a plurality of bits organized into at least one frame, the at least one frame having been altered by replacing a known fixed bit pattern contained within the at least one frame with a result of a first mathematical operation performed using the known fixed bit pattern and one of the plurality of bit patterns contained within the table, the at least one frame also containing a group of remaining bits;
   performing one or more mathematical operations using a group of bits selected from the plurality of bits in the at least one frame and one or more of the plurality of bit patterns contained within the table, each of the one or more mathematical operations producing a result;
   searching the results of the one or more mathematical operations for the known fixed bit pattern and, if the known fixed bit pattern is found, generating a key bit pattern based upon which of the results of the one or more mathematical operations contains the known fixed bit pattern; and
   if the known fixed bit pattern is found in the searching step, generating a group of ancillary data bits based upon the key bit pattern and replacing the group of bits selected from the plurality of bits in the at least one frame with the known fixed bit pattern.

3. The method of claim 2, further comprising the step of delivering the group of ancillary data bits to a user application in response to an event.

4. The method of claim 3, wherein the event is generated by a user entering a geographic area.

5. The method of claim 3, wherein the event is generated at a particular time.

6. A system for encoding ancillary data, comprising:
   a table containing a plurality of bit patterns;
   a selector component, operative to select a key bit pattern from the table based upon a group of ancillary data bits;
   a first encoder component operative to alter at least one frame of bits by replacing a known fixed bit pattern contained within the at least one frame of bits with a result of a first mathematical operation performed using the key bit pattern and the known fixed bit pattern, the at least one frame of bits containing the known fixed bit pattern and a group of bits that vary in value; and
   a transmitter component, operative to transmit the altered at least one frame of bits across a transmission medium.

7. The system of claim 6, further comprising a content protection component, operative to generate the group of ancillary data bits.

8. The system of claim 6, further comprising a behavior tracking component, operative to track user behavior and generate the group of ancillary data bits based upon the user behavior.

9. A system for decoding ancillary data, comprising:
   a table containing a plurality of bit patterns;
   a receiver component operative to receive a plurality of bits organized into at least one frame, the at least one frame having been altered by replacing a known fixed bit pattern contained within the at least one frame with a result of a first mathematical operation performed using the known fixed bit pattern and one of the plurality of bit patterns contained within the table, the at least one frame also containing a group of remaining bits;
   an operator bank component operative to perform one or more mathematical operations using a group of bits selected from the plurality of bits in the at least one frame and one or more of the plurality of bit patterns contained within the table, each of the one or more mathematical operations producing a result;
   a searcher component operative to search the results of the one or more mathematical operations for the known fixed bit pattern and, if the known fixed bit pattern is found, generate a key bit pattern based upon which of the results of the one or more mathematical operations contains the known fixed bit pattern;

a decoder component operative to generate a group of ancillary data bits based upon the key bit pattern; and a frame restorer component operative to replace the group of bits selected from the plurality bits in the at least one frame with the known fixed bit pattern.

10. The system of claim 9, further comprising:

an event processor, operative to process an event;

an ancillary channel processor, operative to receive and buffer the group of ancillary data bits, control the event processor, and communicate with an information source to retrieve additional data; and a media selector, operative to communicate with the event processor and the ancillary channel processor, and direct either the group of ancillary data bits, the group of remaining bits, or the additional data retrieved from the information source to a user application in response to an event or an instruction from the ancillary channel processor.

11. The system of claim 10, wherein the event is generated by a user entering a geographic area.

12. The system of claim 10, wherein the event is generated at a particular time.

13. The system of claim 10, wherein the event is correlated to the content of the group of remaining bits.

14. The system of claim 9, further comprising a pattern detection filter component, operative to verify the key bit pattern generated by the searcher component by comparing the key bit pattern generated by searcher component to an expected result based on a known structure of the at least one frame.

15. A system for encoding ancillary data, comprising:

a storage device;

a transceiver for transmitting bits; and a processor programmed to:

maintain in the storage device a table containing a plurality of bit patterns;

select a key bit pattern from the table based upon a group of ancillary data bits;

alter at least one frame of bits contained within the storage device by replacing a known fixed bit pattern contained within the at least one frame of bits with a result of a first mathematical operation performed using the key bit pattern and the known fixed bit pattern, the at least one frame of bits containing the known fixed bit pattern and a group of bits that vary in value; and direct the transceiver to transmit the altered at least one frame of bits.

16. A system for decoding ancillary data, comprising:

a storage device;

a transceiver for receiving bits;

a processor programmed to:

maintain in the storage device a table containing a plurality of bit patterns;

receive from the transceiver a plurality of bits organized into at least one frame, the at least one frame having been altered by replacing a known fixed bit pattern contained within the at least one frame with a result of a first mathematical operation performed using the known fixed bit pattern and one of the plurality of bit patterns contained within the table, the at least one frame also containing a group of remaining bits;

store the at least one frame in the storage device;

perform one or more mathematical operations using a group of bits selected from the plurality of bits in the at least one frame and one or more of the plurality of bit patterns contained within the table, each of the one or more mathematical operations producing a result;

search the results of the one or more mathematical operations for the known fixed bit pattern and, if the known fixed bit pattern is found, generate a key bit pattern based upon which of the results of the one or more mathematical operations contains the known fixed bit pattern;

generate a group of ancillary data bits based upon the key bit pattern and store the group of ancillary bits in the storage device;

replace the group of bits selected from the plurality of bits in the at least one frame with the known fixed bit pattern; and deliver the group of ancillary data bits to a user application in response to an event.

17. A computer-readable non-transitory medium having computer-executable instructions for performing a method comprising the following steps:

providing a plurality of bits organized into at least one frame, the at least one frame containing a known fixed bit pattern and a group of bits that vary in value;

selecting a key bit pattern from a table based upon a group of ancillary data bits, the table containing a plurality of bit patterns;

altering the at least one frame by replacing the known fixed bit pattern with a result of a first mathematical operation performed using the known fixed bit pattern and the key bit pattern; and transmitting the altered at least one frame across a transmission medium.

18. A computer-readable non-transitory medium having computer-executable instructions for performing a method comprising the following steps:

providing a table containing a plurality of bit patterns;

receiving a plurality of bits organized into at least one frame, the at least one frame having been altered by replacing a known fixed bit pattern contained within the at least one frame with a result of a first mathematical operation performed using the known fixed bit pattern and one of the plurality of bit patterns contained within the table, the at least one frame also containing a group of remaining bits;

performing one or more mathematical operations using a group of bits selected from the plurality of bits in the at least one frame and one or more of the plurality of bit patterns contained within the table, each of the one or more mathematical operations producing a result;

searching the results of the one or more mathematical operations for the known fixed bit pattern and, if the known fixed bit pattern is found, generating a key bit pattern based upon which of the results of the one or more mathematical operations contains the known fixed bit pattern;

if the known fixed bit pattern is found in the searching step, generating a group of ancillary data bits based upon the key bit pattern and replacing the group of bits selected from the plurality of bits in the at least one frame with the known fixed bit pattern; and delivering the group of ancillary data bits to a user application in response to an event.

* * * * *